US012729739B2

(12) United States Patent
Luo et al.

(10) Patent No.: US 12,729,739 B2
(45) Date of Patent: Sep. 8, 2026

(54) CONNECTING TERMINAL ASSEMBLY FOR A GROW LIGHT AND GROW LIGHT MECHANISM

(71) Applicant: Sinowell (Shanghai) Co., Ltd., Shanghai (CN)

(72) Inventors: Jia Luo, Shanghai (CN); Yunfei Duan, Shanghai (CN); Liang Zhou, Shanghai (CN)

(73) Assignee: SINOWELL (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 19/217,228

(22) Filed: May 23, 2025

(65) Prior Publication Data

US 2026/0168552 A1 Jun. 18, 2026

(30) Foreign Application Priority Data

Dec. 13, 2024 (CN) ........................ 202423103291.5

(51) Int. Cl.

| | |
|---|---|
| ***F16F 1/36*** | (2006.01) |
| ***A01G 7/04*** | (2006.01) |
| ***F21V 21/005*** | (2006.01) |

(52) U.S. Cl.

CPC ................ *F16F 1/36* (2013.01); *A01G 7/045* (2013.01); *F21V 21/005* (2013.01); *F16F 2224/025* (2013.01)

(58) Field of Classification Search

CPC .... F21K 9/272; F21K 9/27; F21S 4/28; F21V 21/005; F16F 2224/025; A01G 7/045

See application file for complete search history.

(56) References Cited

U.S. PATENT DOCUMENTS

| | | | | |
|---|---|---|---|---|
| 7,331,687 | B1 * | 2/2008 | Noh | F21S 4/20<br>362/217.05 |
| 10,587,080 | B2 * | 3/2020 | Wang | F21V 23/06 |
| 11,953,166 | B2 * | 4/2024 | Rizzo | F21V 23/06 |
| 2011/0305013 | A1 * | 12/2011 | Yamazaki | F21K 9/272<br>362/223 |
| 2014/0071668 | A1 * | 3/2014 | Ai | F21S 8/00<br>362/217.17 |
| 2014/0160731 | A1 * | 6/2014 | Ye | F21V 21/025<br>362/92 |
| 2020/0191338 | A1 * | 6/2020 | Yamazaki | F21S 8/06 |

* cited by examiner

*Primary Examiner* — Zheng Song

(74) *Attorney, Agent, or Firm* — Arentfox Schiff LLP

(57) ABSTRACT

Provided are a connecting terminal assembly for a grow light and a grow light mechanism. The connecting terminal assembly for the grow light includes a base, a terminal, and a damping member. A mounting through hole is disposed in the middle of the base. The terminal passes through the mounting through hole. The damping member is made of a flexible material and fits the side of the base facing a light tube. In the connecting terminal assembly for the grow light and the grow light mechanism, the damping member is made of a well-deformable flexible material that can fully absorb force acting on the light tube and/or the connecting terminal assembly.

8 Claims, 8 Drawing Sheets

CONNECTING TERMINAL ASSEMBLY FOR A GROW LIGHT AND GROW LIGHT MECHANISM

CROSS-REFERENCE TO RELATED APPLICATION

This application claims priority to Chinese Patent Application No. 202423103291.5 filed Dec. 13, 2024, the disclosure of which is incorporated herein by reference in its entirety.

TECHNICAL FIELD

The present disclosure relates to the field of lighting devices, particularly a connecting terminal assembly for a grow light and a grow light mechanism.

BACKGROUND

A grow light is a device for providing illumination for plants such as flowers and crops and is typically positioned below the branches and leaves of the plants. To facilitate management, plants are often planted in clusters, requiring grow lights to supply continuous illumination over a relatively long distance.

An existing solution is to connect multiple grow lights sequentially to form a long light tube combination, thereby providing illumination for plants in a ridge. Specifically, a terminal structure is connected between two adjacent grow lights to enable electrical connection and signal communication between the two adjacent grow lights.

The drawbacks of the existing structure include that the terminal structure and the cover plates at the ends of the grow lights are both made of rigid materials. However, connecting two grow lights requires forceful insertion. As a result, during the insertion, the grow lights may be damaged under the stress at the ends of the grow lights and thus have a shorter service life.

SUMMARY

An object of the present disclosure is to provide a connecting terminal assembly for a grow light and a grow light mechanism to solve the problem that an existing grow light is prone to damage when inserted and prolong the service life of the grow light.

To achieve this object, in one aspect, the present disclosure uses the following solution:

The connecting terminal assembly for the grow light includes a base, a terminal, and a damping member. A mounting through hole is disposed in the middle of the base. The terminal passes through the mounting through hole. The damping member is made of a flexible material and attached to the side of the base facing a light tube.

In an embodiment, the damping member includes a sheet-shaped damping body, a damping through hole aligned with the mounting through hole is formed on the damping body, and the terminal passes through the damping through hole.

In an embodiment, the edge of the base bends and extends toward the light tube to form a base limiting edge, the edge of the damping body bends and extends toward the light tube to form a damping limiting edge, and the damping limiting edge is located between the base limiting edge and the light tube.

In an embodiment, toward the light tube, a contact ridge is formed on the surface of the damping body, and the contact ridge surrounds the periphery of the damping through hole.

In an embodiment, the inner peripheral surface of the damping through hole is attached to the outer peripheral surface of the terminal.

In an embodiment, the inner peripheral surface of the damping through hole is in a serrated shape, a wavy shape, or a burr-like shape.

In an embodiment, the thickness of the damping member is measured along the axial direction of the damping through hole, and the inner peripheral surface of the damping through hole is where the damping member is thickest.

In an embodiment, the connecting terminal assembly for the grow light also includes a guide member. A base guide hole is formed on the base. A damping member guide hole is formed on the damping member. The guide member passes through the base guide hole and the damping member guide hole in sequence.

In an embodiment, the damping member is made of silicone.

In another aspect, the present disclosure uses the following solution:

The grow light mechanism includes at least two light tubes and the preceding connecting terminal assembly for the grow light. The connecting terminal assembly for the grow light connects two adjacent light tubes.

The connecting terminal assembly for the grow light of the present disclosure includes a base and a damping member. The damping member is attached to the side of the base facing the light tube. The damping member is made of a well-deformable flexible material that can fully absorb force acting on the light tube and/or the connecting terminal assembly, preventing force-caused deformation or displacement of surrounding components and ensuring safer use.

The grow light mechanism of the present disclosure also includes the preceding connecting terminal assembly for the grow light. The damping member made of a flexible material can fully fill the gap between an end of the light tube and the base, preventing substance such as dust and moisture from entering the light tube through the gap, enabling the light tube to have a more stable operational performance, and extending the service life of the light tube.

REFERENCE LIST

Figure 1:
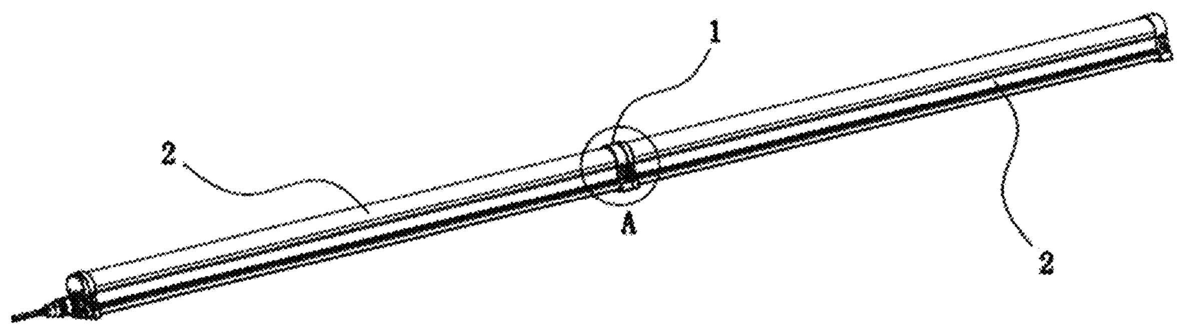
FIG. 1 is a view of a grow light mechanism according to an embodiment of the present disclosure.

1. connecting terminal assembly, 2. light tube, 11. base, 12. terminal, 13. damping member, 14. opposite-side joint, 111. mounting through hole, 112. base limiting edge, 113. base guide hole, 131. damping body, 132. damping through hole, 133. damping limiting edge, 134. contact ridge, 135. inner peripheral surface, 136. damping member guide hole.

DETAILED DESCRIPTION

In order that the preceding object, features, and advantages of the present disclosure can be more apparent and easier to understand, examples of the present disclosure are described below in detail in conjunction with drawings. Details are set forth below to facilitate a thorough understanding of the present disclosure. However, the present disclosure can be implemented in many modes different from the embodiments described herein, and those skilled in the art can make similar modifications without departing from the connotation of the present disclosure, so the present disclosure is not limited by the embodiments described below.

In the description of the present disclosure, it is to be understood that orientations or position relations indicated by terms such as "center", "longitudinal", "lateral", "length", "width", "thickness", "above", "below", "front", "back", "left", "right", "vertical", "horizontal", "top", "bottom", "inside", "outside", "clockwise", "counterclockwise", "axial", "radial", and "circumferential" are based on orientations or position relations shown in the drawings. These orientations or position relations are intended only to facilitate the description of the present disclosure and simplify the description and not to indicate or imply that an apparatus or element referred to must have such specific orientations or must be configured or operated in such specific orientations. Thus, these orientations or position relations are not to be construed as limiting the present disclosure.

Moreover, terms like "first" and "second" are merely for description and are not to be construed as indicating or implying relative importance or implicitly indicating the number of technical features as indicated. Thus, a feature defined as a "first" feature or a "second" feature may expressly or implicitly include at least one of this feature. As used herein, the term "multiple" is defined as at least two, for example, two, three or the like, unless otherwise specified and limited.

In the present disclosure, unless otherwise expressly specified and limited, the term "installed", "connected to each other", "connected", or "secured" is to be construed in a broad sense, for example, as securely connected, detachably connected, or integrated; mechanically connected or electrically connected; directly connected to each other or indirectly connected to each other via an intermediary; or internally connected between two components or interactional relations between two components. For those of ordinary skill in the art, specific meanings of the preceding terms in the present disclosure may be understood according to specific situations.

Unless otherwise expressly specified and limited, a first feature "above" or "below" a second feature is to be construed as the first feature directing contacting the second feature, or the first feature indirectly contacting the second feature via an intermediary. Moreover, when the first feature is described as "on", "above", or "over" the second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

It is to be noted that when an element is described as being "fixed to" or "disposed on" another element, the element may be directly on the particular element or an intervening element may be on the particular element. When an element is considered as being "connected to" another element, it may be directly connected to the particular element or intervening elements may be present at the same time. The terms "vertical", "horizontal", "upper", "lower", "left", "right" and the like, as used herein, are only used for an illustrative purpose and are not the only embodiment.

Figure 2:
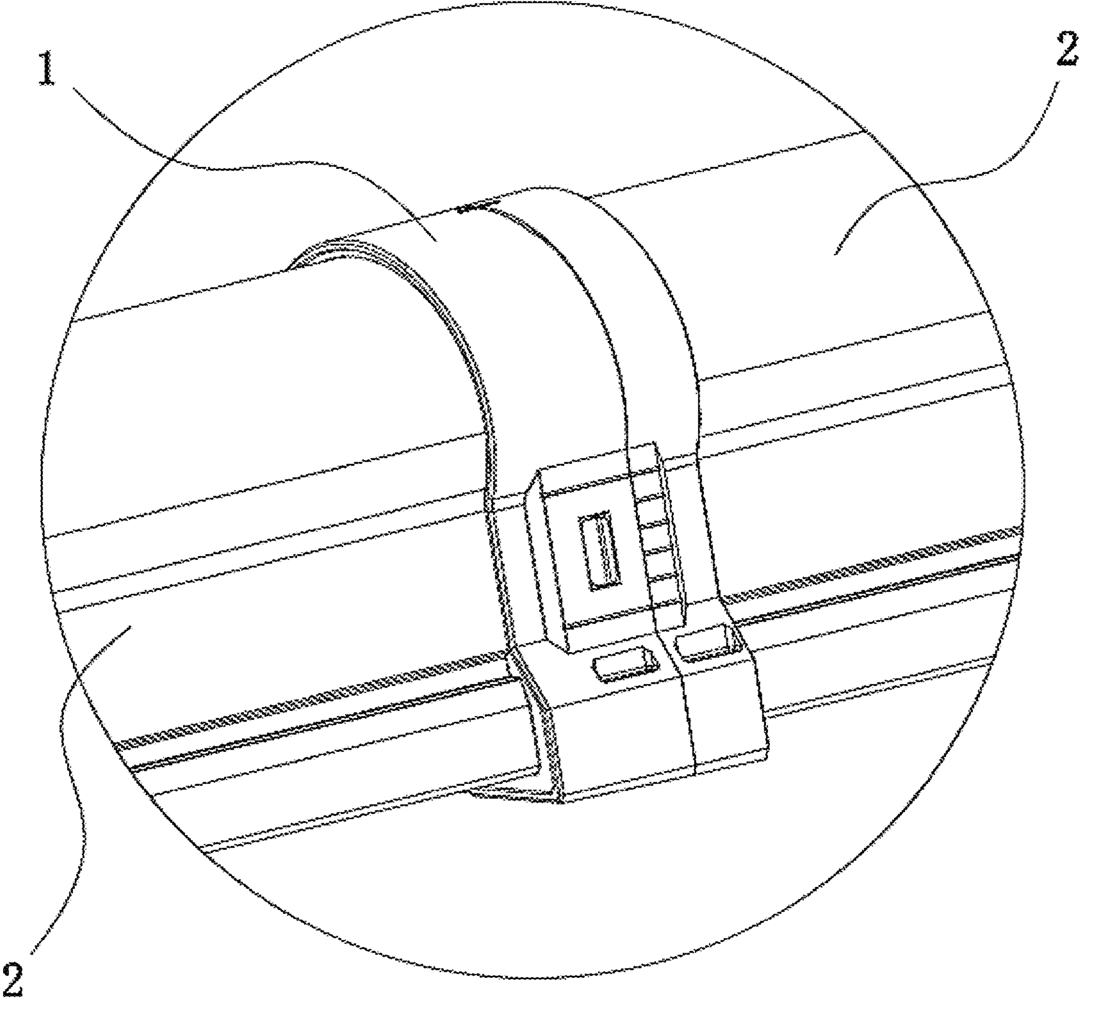
FIG. 2 is an enlarged view of part A of FIG. 1.
Figure 3:
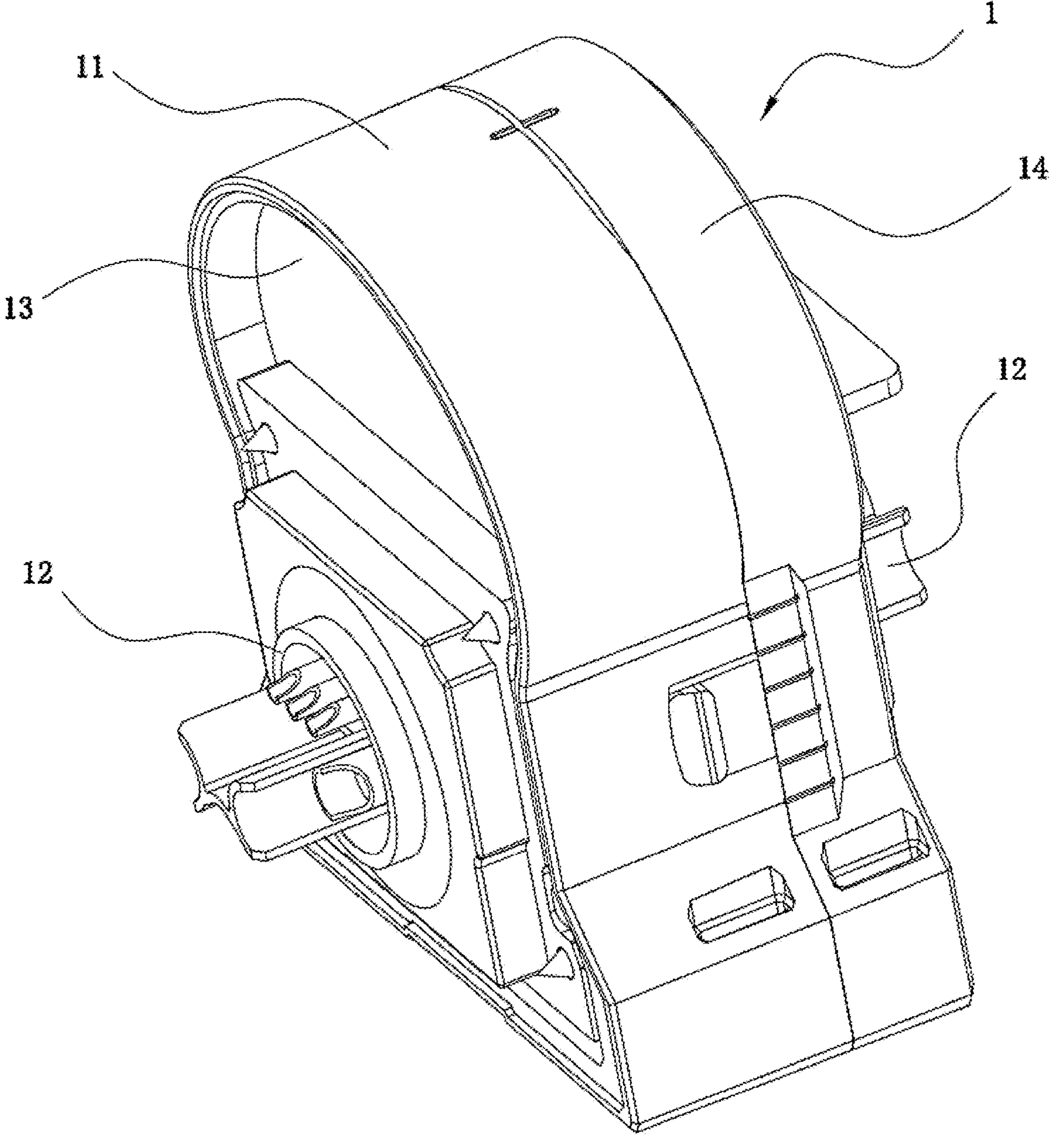
FIG. 3 is a view of a connecting terminal assembly according to an embodiment of the present disclosure.
Figure 4:
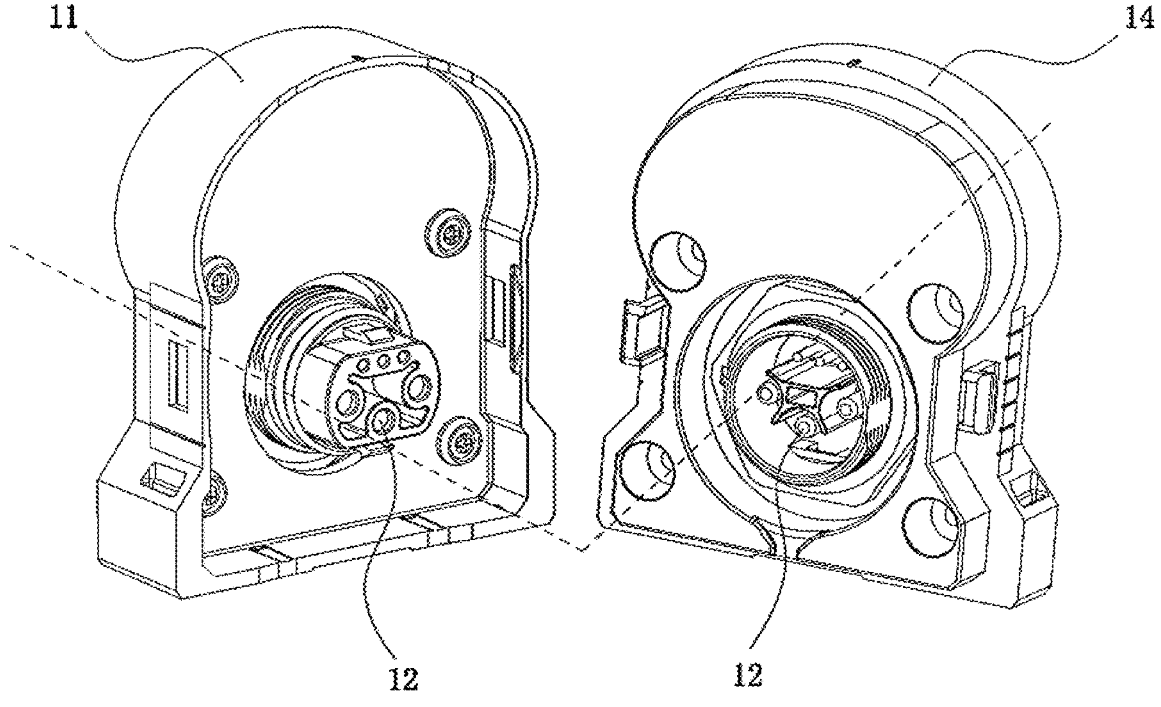
FIG. 4 is a view of a connecting terminal assembly split into a left part and a right part according to an embodiment of the present disclosure.
Figure 5:
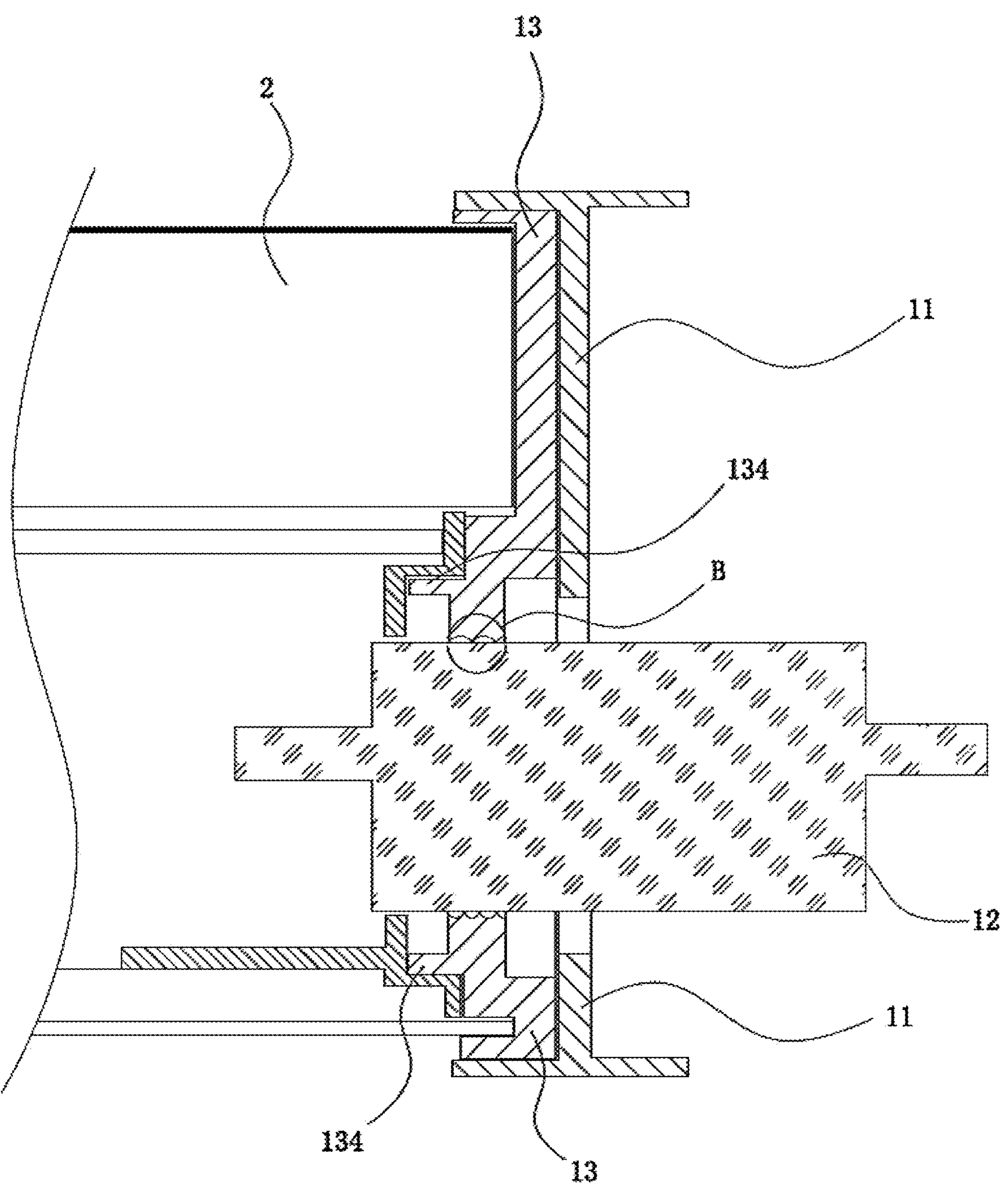
FIG. 5 is a section view of an assembly of a connecting terminal assembly and a light tube according to an embodiment of the present disclosure.
Figure 6:
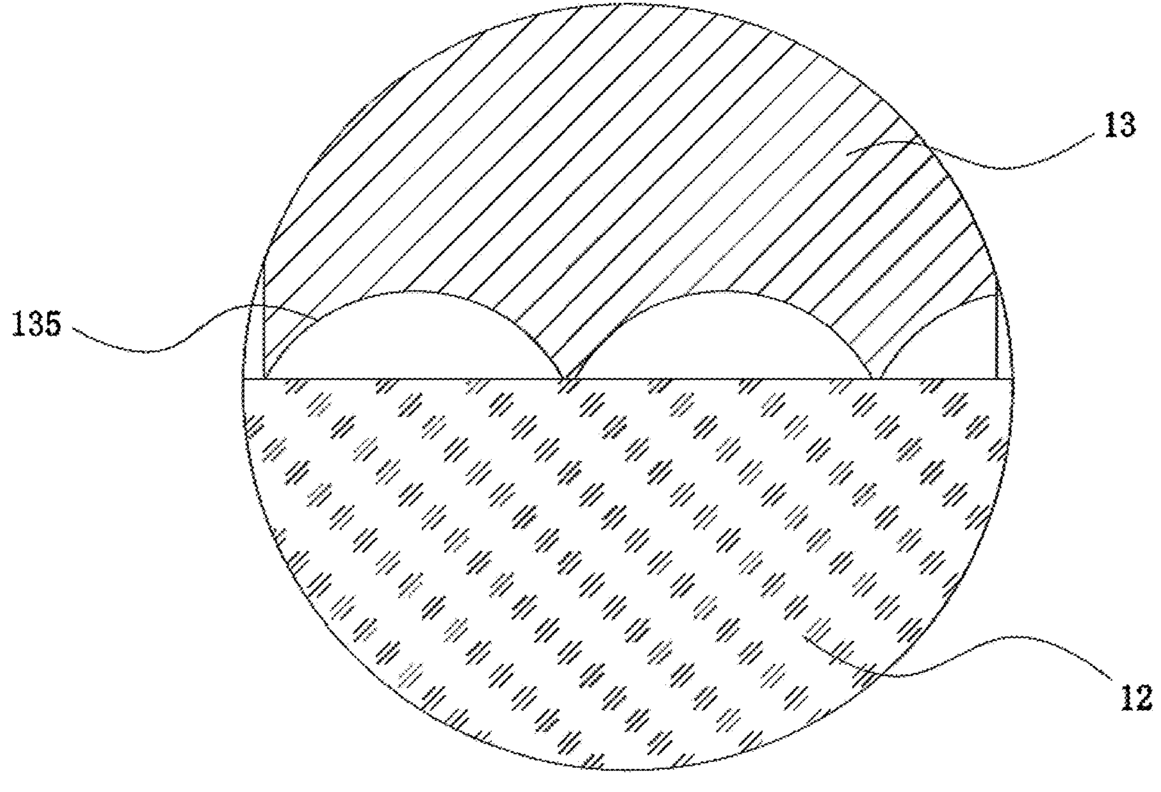
FIG. 6 is an enlarged view of part B of FIG. 5.
Figure 7:
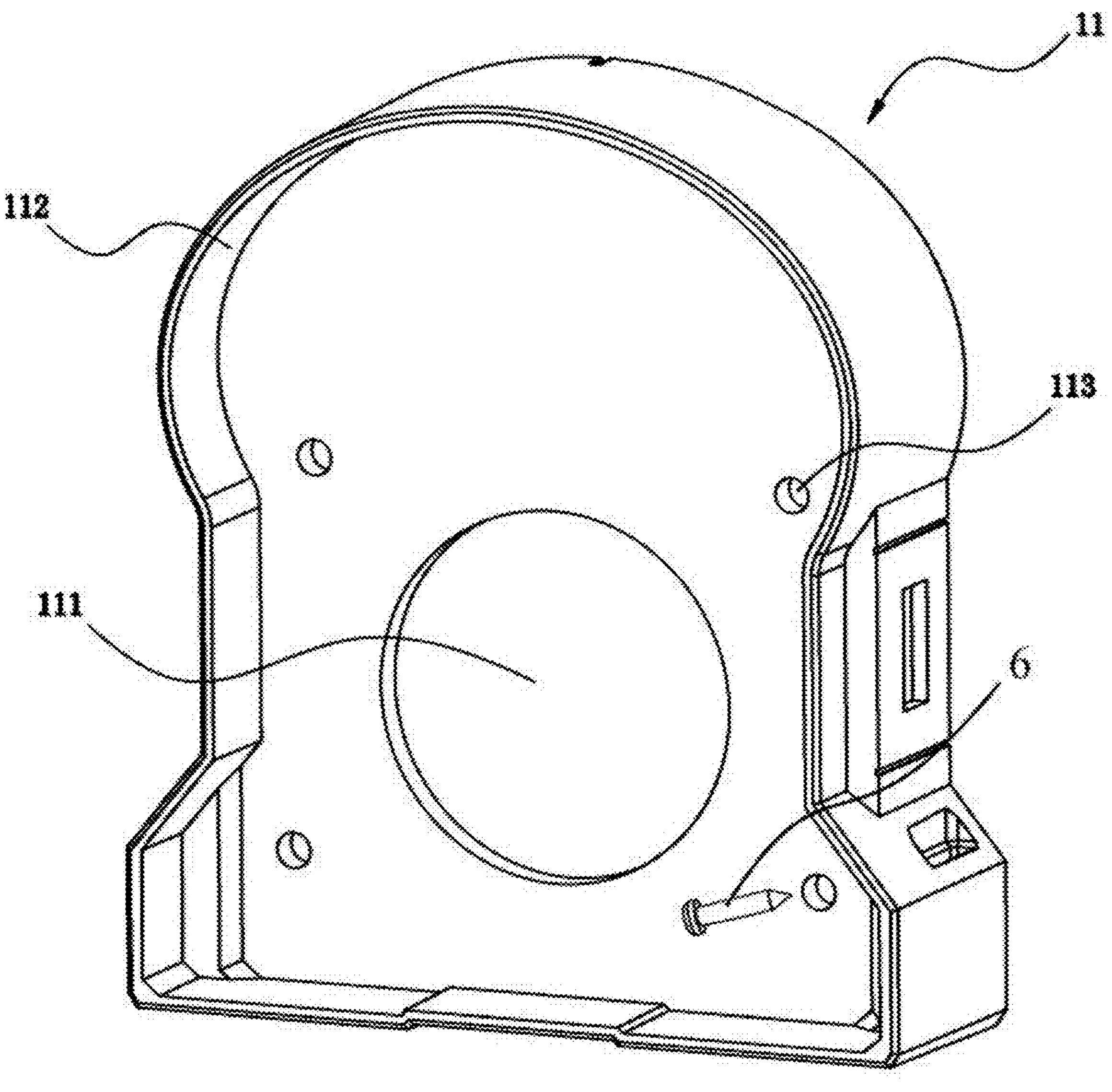
FIG. 7 is a view of a base according to an embodiment of the present disclosure.
Figure 8:
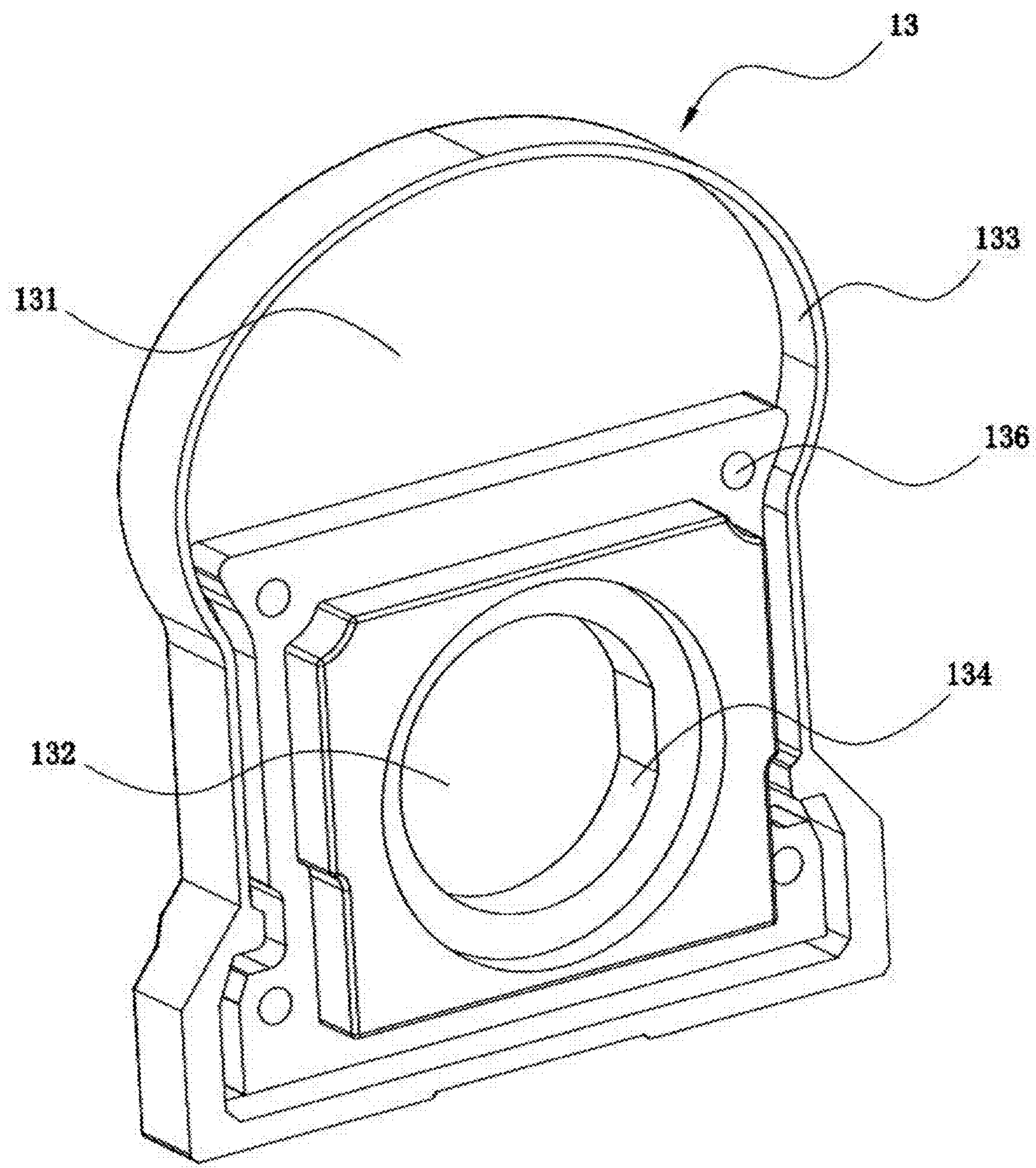
FIG. 8 is view one of a damping member according to an embodiment of the present disclosure.
Figure 9:
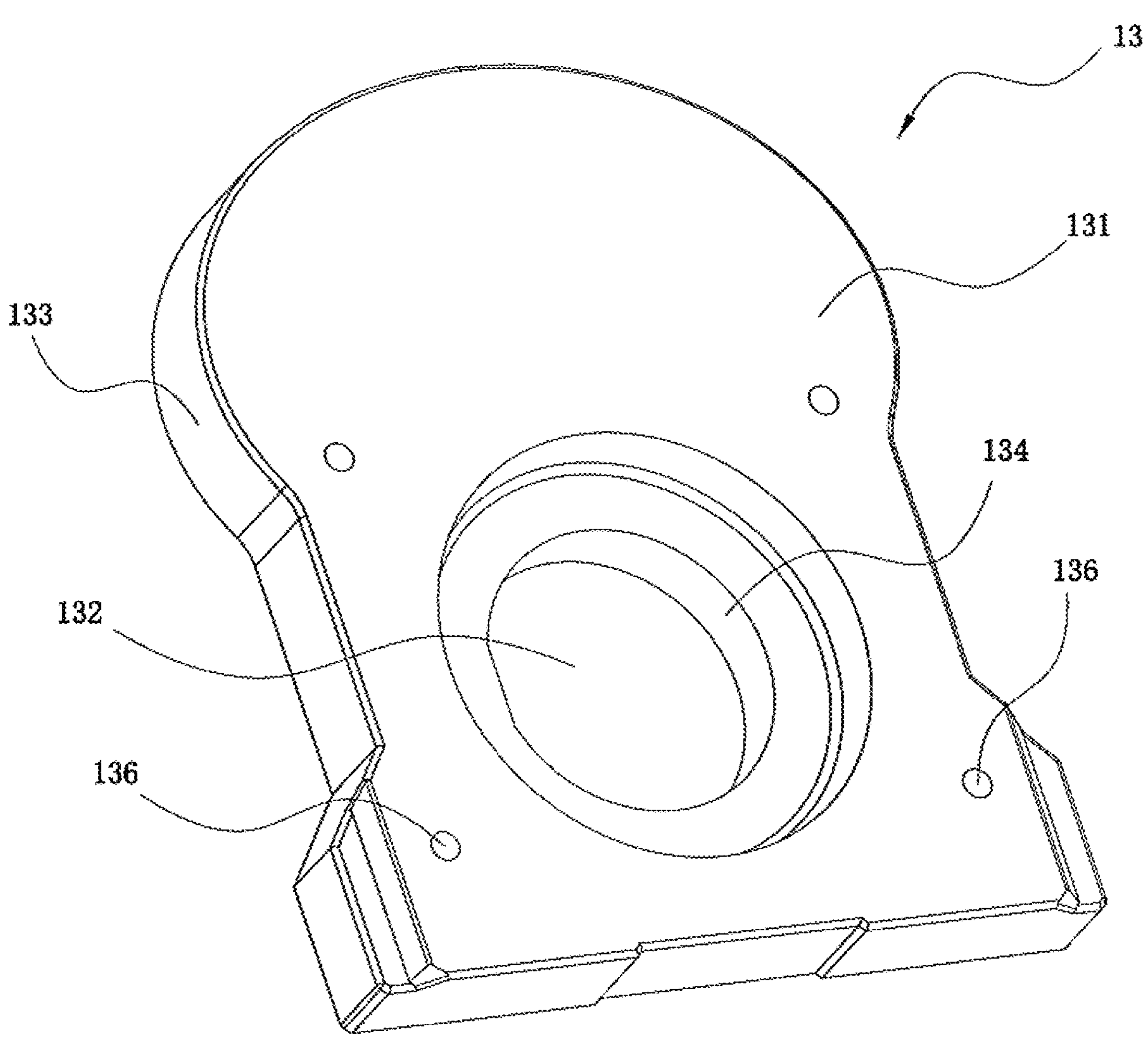
FIG. 9 is view two of a damping member according to an embodiment of the present disclosure.

This embodiment provides a connecting terminal assembly for a grow light and a grow light mechanism that includes the connecting terminal assembly to provide illumination for plants. As shown in FIGS. 1 and 2, the grow light mechanism includes at least two light tubes 2 and a connecting terminal assembly 1. The connecting terminal assembly 1 connects two adjacent light tubes 2, achieving electrical connection and signal communication between two light tubes 2.

As shown in FIGS. 1 to 9, the connecting terminal assembly 1 for the grow light includes a base 11, a terminal 12, a damping member 13, and an opposite-side joint 14. One light tube 2 is connected to the base 11. The other light tube 2 is connected to the opposite-side joint 14. After the base 11 abuts the opposite-side joint 14, the two light tubes 2 are connected to each other. The base 11 has a mounting through hole 111 in the middle of the base 11. The terminal 12 passes through the mounting through hole 111 and is secured to the base 11 via bolts. The damping member 13 is attached to the side of the base 11 facing the light tube 2.

When assembling the light tube 2 and the connecting terminal assembly 1, it is required to insert the terminal 12 of the connecting terminal assembly 1 into an end of the light tube 2 to make the end face of the light tube 2 abuts the damping member 13. After the insertion is complete, any force applied by the user to the light tube 2 and/or the connecting terminal assembly 1 does not immediately dissipate but acts on the surrounding connected components, potentially causing displacement or loosening to the surrounding connected components and affecting the normal operation of these components. The damping member 13 is made of a well-deformable flexible material that can fully absorb the applied force. The force applied by the user to the light tube 2 and/or the connecting terminal assembly 1, other than the force used for inserting the terminal 12 into the light tube 2, is primarily absorbed by the damping member 13, preventing deformation or displacement of the surrounding components, thus ensuring safer use.

Additionally, the damping member 13 made of a flexible material can fully fill the gap between the end of the light tube 2 and the base 11, preventing dust, water vapor, and other substances from entering the light tube 2 through the gap between the end of the light tube 2 and the base 11, enabling the light tube 2 to have a more stable operational performance and a longer service life. Moreover, after the gap is filled by the damping member 13, the connection structure between the end of the light tube 2 and the base 11 becomes more stable, preventing relative shaking and avoiding damage to the terminal 12 and the light tube 2, thus prolonging the overall service life of the grow light mechanism.

Each side of the connecting terminal assembly 1 is connected to a light tube 2. Accordingly, the base 11 has a damping member 13 on the side of the base 11 facing one light tube 2, and the opposite-side joint 14 can also have a damping member 13 on the side of the opposite-side joint 14 facing the other light tube 2. The damping member 13 on one side is required to be made of a flexible material. With a soft connection between the damping member 13 and the base 11, the deformation capability of the flexible material is used to absorb the force during insertion, preventing the force from transferring to the other side of the base 11. When the terminal 12 or the end of the light tube 2 is subjected to a large radial force, the damping member 13, with its excellent deformation ability, ensures that the terminal 12 easily disengages from the damping member 13, thus preventing damage to the terminal 12.

The damping member 13 on the other side may be made of a flexible material to enhance its force absorption capacity or may be made of a rigid material to increase the overall strength of the connecting terminal assembly 1, expand the application range, and stabilize the spatial orientation of the light tube 2. In this embodiment, the damping member 13 on the base 11 is made of a flexible material by way of example.

The shape of the damping member 13 is not limited as long as the damping member 13 can isolate the end of the light tube 2 from the base 11. In this embodiment, the damping member 13 includes a sheet-shaped damping body 131, and the base 11 includes a sheet-shaped partition. The damping body 131 is attached to the partition. The damping body 131 has a damping through hole 132 aligned with the mounting through hole 111. The terminal 12 passes through the damping through hole 132, not affecting the normal connection between the terminal 12 and the light tube 2.

To prevent the light tube 2 from moving radially after assembly, the edge of the base 11 bends and extends toward the light tube 2 to form a base limiting edge 112. After assembly, the base limiting edge 112 is sleeved on the periphery of the end of the light tube 2. In this embodiment, the edge of the damping body 131 bends and extends toward the light tube 2 to form a damping limiting edge 133. After assembly, the damping limiting edge 133 is positioned between the base limiting edge 112 and the light tube 2, preventing rigid impact between the end of the light tube 2 and the base limiting edge 112, thus extending the service life of the light tube 2.

In a direction toward the light tube 2, a contact ridge 134 is formed on the surface of the damping body. Specifically, the contact ridge 134 surrounds the outer periphery of the damping through hole 132. The extension direction of the contact ridge 134 is the same as that of the damping limiting edge 133, both primarily designed to cooperate with the end structure of the light tube 2 to enhance the structural stability after assembly.

To improve the sealing performance, the inner peripheral surface 135 of the damping through hole 132 fits the outer peripheral surface of the terminal 12, blocking the infiltration passage of dust and water vapor. Made of a flexible material, the damping member 13 has strong deformation capability, and the inner diameter of the damping through hole 132 can be slightly smaller than the outer diameter of the terminal 12. When the terminal 12 passes through the damping through hole 132, the inner diameter of the damping through hole 132 is slightly enlarged, causing the inner peripheral surface 135 to more tightly fit the outer peripheral surface of the terminal 12.

The shape of the inner peripheral surface 135 is not limited as long as the inner peripheral surface 135 can fit tightly with the outer peripheral surface of the terminal 12. The inner peripheral surface 135 may be flat for easy processing. The inner peripheral surface 135 may also be serrated, wavy, or burr-like, with strong deformation capability to fully fill the gap between the inner peripheral surface 135 and the outer peripheral surface of the terminal 12, requiring less precision in processing.

The thickness of the damping member 13 is measured along the axial direction of the damping through hole. The inner peripheral surface 135 of the damping through hole 132 is where the damping member 13 is thickest. That is, when measured along the axial direction of the damping through hole 132, the thickness of the damping member 13 at the inner peripheral surface 135 is greater than that at other positions. The inner peripheral surface 135 can fully contact the outer peripheral surface of the terminal 12, that is, has a larger area of contact with the outer peripheral surface of the terminal 12, preventing dust, water vapor, and other substances from entering the light tube 2 through the gap between the inner peripheral surface 135 and the terminal 12, thereby making the light tube 2 safer to use and extending the service life of the light tube 2.

Based on the preceding structure, the connecting terminal assembly for the grow light also includes a guide member 6. A base guide hole 113 is formed on the base 11. A damping member guide hole 136 is formed on the damping member 13. The guide member passes through the base guide hole 113 and the damping member guide hole 136 in sequence. During use, the guide member 6 is first inserted into the base guide hole 113 and fixed, and then the damping member guide hole 136 is sleeved onto the guide member, enabling quick positioning of the damping member 13 and improving mounting efficiency.

The material of the damping member 13 is not limited as long as the damping member 13 can absorb the impact force when the light tube 2 strikes the base 11 during assembly. In this embodiment, the damping member 13 is made of silicone that has excellent deformation ability and can fully absorb impact force. Moreover, the damping member 13 is well-developed, cost-effective, and stable in performance.

It is to be noted that the preceding are only preferred embodiments of the present disclosure and technical principles used therein. It will be understood by those skilled in the art that the present disclosure is not limited to the specific embodiments described herein. Those skilled in the art can make various apparent changes, modifications and substitutions without departing from the scope of the present disclosure. Therefore, while the present disclosure is described in detail in conjunction with the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A connecting terminal assembly for a grow light, comprising:

a base, wherein a mounting through hole is disposed in a middle of the base;

a terminal passing through the mounting through hole; and a damping member attached to a side of the base facing a light tube, wherein the damping member is made of a flexible material;

wherein the damping member comprises a sheet-shaped damping body, a damping through hole aligned with the mounting through hole is formed on the damping body, and the terminal passes through the damping through hole; and wherein an inner peripheral surface of the damping through hole fits an outer peripheral surface of the terminal, so that the terminal is fixed in the base through the damping through hole.

2. The connecting terminal assembly for the grow light according to claim 1, wherein an edge of the base bends and extends toward the light tube to form a base limiting edge, an edge of the damping body bends and extends toward the light tube to form a damping limiting edge, and the damping limiting edge is located between the base limiting edge and the light tube.

3. The connecting terminal assembly for the grow light according to claim 1, wherein in a direction toward the light tube, a contact ridge is formed on a surface of the damping body, and the contact ridge surrounds a periphery of the damping through hole.

4. The connecting terminal assembly for the grow light according to claim 1, wherein the inner peripheral surface of the damping through hole is in a serrated shape, a wavy shape, or a burr-like shape.

5. The connecting terminal assembly for the grow light according to claim 1, wherein a thickness of the damping member is measured along an axial direction of the damping through hole, and the inner peripheral surface of the damping through hole is where the damping member is thickest.

6. The connecting terminal assembly for the grow light according to claim 1, further comprising a guide member, wherein a base guide hole is formed on the base, a damping member guide hole is formed on the damping member, and the guide member passes through the base guide hole and the damping member guide hole in sequence.

7. The connecting terminal assembly for the grow light according to claim 1, wherein the damping member is made of silicone.

8. A grow light mechanism, comprising at least two light tubes and a connecting terminal assembly for a grow light, wherein the connecting terminal assembly for the grow light connects two adjacent ones of the at least two light tubes;

wherein the connecting terminal assembly comprises:

a base, wherein a mounting through hole is disposed in a middle of the base;

a terminal passing through the mounting through hole; and a damping member attached to a side of the base facing a light tube, wherein the damping member is made of a flexible material;

wherein the damping member comprises a sheet-shaped damping body, a damping through hole aligned with the mounting through hole is formed on the damping body, and the terminal passes through the damping through hole; and wherein an inner peripheral surface of the damping through hole fits an outer peripheral surface of the terminal, so that the terminal is fixed in the base through the damping through hole.

* * * * *